United States Patent
Hoche et al.

(10) Patent No.: US 7,738,477 B2
(45) Date of Patent: Jun. 15, 2010

(54) BUS ARCHITECTURE AND METHOD FOR EXCHANGING DATA

(75) Inventors: Peter Hoche, Schmitten (DE); Stefan Orth, Eschenburg (DE)

(73) Assignee: Diehl Avionik Systeme GmbH, Ueberlingen (DE)

( * ) Notice: Subject to any disclaimer, the term of this patent is extended or adjusted under 35 U.S.C. 154(b) by 939 days.

(21) Appl. No.: 11/485,673

(22) Filed: Jul. 13, 2006

(65) Prior Publication Data

US 2007/0025375 A1  Feb. 1, 2007

(30) Foreign Application Priority Data

Jul. 29, 2005  (DE) .................. 10 2005 035 611

(51) Int. Cl.
*H04L 12/28* (2006.01)
(52) U.S. Cl. ..................................... 370/431
(58) Field of Classification Search ......... 370/431–433, 370/438–440, 445, 457, 449–462; 340/945, 340/959
See application file for complete search history.

(56) References Cited

U.S. PATENT DOCUMENTS

| | | | | |
|---|---|---|---|---|
| 4,633,461 A | * | 12/1986 | Banton et al. ............... | 370/384 |
| 4,787,082 A | * | 11/1988 | Delaney et al. ............. | 370/216 |
| 4,829,297 A | * | 5/1989 | Ilg et al. ..................... | 370/449 |
| 5,404,536 A | * | 4/1995 | Ramakrishnan et al. ..... | 710/220 |
| 5,434,861 A | * | 7/1995 | Pritty et al. ................. | 370/449 |
| 5,684,803 A | * | 11/1997 | Nguyen Thuy ............. | 370/451 |
| 5,793,946 A | | 8/1998 | Gauthier et al. | |
| 6,897,790 B2 | * | 5/2005 | Orton .......................... | 340/945 |
| 2003/0039243 A1 | | 2/2003 | Parker | |

FOREIGN PATENT DOCUMENTS

| | | |
|---|---|---|
| DE | 36 28 299 C2 | 2/1988 |
| DE | 39 19 144 C1 | 12/1990 |
| DE | 197 23 274 C2 | 12/1998 |
| EP | 0 883 264 A1 | 12/1998 |

OTHER PUBLICATIONS

International Standard ISO 11898, "Road vehicles—Interchange of digital information—Controller area network (CAN) for high-speed communication" First edition Nov. 15, 1993, reference No. ISO 11898:1993(E), International Organization for Standardization, Switzerland.

* cited by examiner

*Primary Examiner*—Dmitry H Levitan
(74) *Attorney, Agent, or Firm*—Laurence A. Greenberg; Werner H. Stemer; Ralph E. Locher

(57) ABSTRACT

A bus architecture has a central processing unit, a data line and bus users. The central processing unit and the bus users are connected to the data line via a bus interface. The data line is constructed as a ring and the central processing unit has two transceiver units which can be switched between transmit and receive modes. The central processing unit provides a clocked emission of data intended for the bus users. The bus users are successively connected to the data line, and each contains a monitoring unit, which is connected to the associated bus interface and is configured for activating a transmit activity of the bus interface only after receiving a synchronization message, and otherwise blocks this activity. In a method for exchanging data with such a bus architecture, a high fault tolerance, particularly when the data line is cut through, and error locating capability are achieved.

15 Claims, 6 Drawing Sheets

BUS ARCHITECTURE AND METHOD FOR EXCHANGING DATA

BACKGROUND OF THE INVENTION

Field of the Invention

The invention relates to a bus architecture, particularly for aircraft, with a central processing unit, a data line and a number of bus users. The central processing unit and the bus users are in each case connected to the data line via a bus interface. The invention also relates to a method for exchanging data with such a bus architecture.

Such a bus architecture is used for exchanging data between the central processing unit and the bus users. In this manner, it is possible both to call up data via the bus users and supply data to the bus users.

A bus architecture is primarily configured for obtaining a data exchange with the lowest possible error rate. This can be achieved, for example, via the embodiment of the data line as such or via the type of coding of the data to be exchanged. For the coding of the data, so-called bus control units are responsible which convert electronic data coming from hardware or from software into the data intended for the data exchange by the bus architecture in a predetermined protocol. The central processing unit and the bus users are also connected to the data line by a bus interface, the bus interface effecting a level adaptation of the data supplied by the bus control unit into the data line on a physical plane. The individual bus users can also be connected or disconnected by the bus interface.

Bus users can be sensors, controls, actuators, data memories or general hardware or software chips. The central processing unit has the task of centrally monitoring the individual bus users, to control them or to call up data from the bus users. The central processing unit is also called a "master" whereas the other bus users connected to the central processing unit via the data line are also called "slaves".

In aviation, in particular, strict requirements with regard to fault tolerance and with regard to the error rate must be set for a bus architecture. In this context, a bus architecture in which each bus user is connected to the central processing unit via a separate data line would have a low error rate with regard to the data exchange. There would be no influence due to other data located on the data line. However, such a bus architecture disadvantageously has a natural weight which cannot be tolerated, particularly in aviation.

SUMMARY OF THE INVENTION

It is accordingly an object of the invention to provide a bus architecture and a method for exchanging data which overcomes the above-mentioned disadvantages of the prior art devices and methods of this general type, in which many bus users can be addressed via a common data line, which has high availability, allows errors to be located and, in particular, does not fail even when the data line is cut through. It is also the object of the invention to specify a method for exchanging data by such a bus architecture which has the same advantages.

The task mentioned first is achieved according to the invention for a bus architecture of the type initially mentioned in that the data line is constructed as a ring in which both ends of the data line are connected to the central processing unit. The central processing unit has transceiver units which can be switched between transmit and receive modes. One transceiver unit in each case is connected to one end of the data line via a bus interface. The central processing unit is prepared for clocked emission of the data intended for the bus users, and that the bus users are successively connected to the data line. The bus users have a monitoring unit which is in each case connected to the associated bus interface and is configured for activating a transmit activity of the interface only after receiving a synchronization message, and otherwise blocking this activity.

In a first step, the invention is based on the concept that, if the data line is cut through, the bus users connected in the part of the data line which is separated from the central processing unit are irrevocably removed from the data exchange. However, this can be prevented if a data line to which the bus users are successively connected does not end in a termination, as usual, or the free end is connected again to the central processing unit. As a result, a ring-shaped form of the data line is achieved. For the central processing unit connected to both ends of the data line, it becomes possible to exchange data with each bus user via two separate lines, namely via the two arms of the ring formed. If the data line is cut through at one point, a data exchange in one direction still remains for all bus users since the branches of the data line cut through still remain connected to the central processing unit in each case.

In a further step, the invention is based on the concept that an error can be easily located in such a data line formed as a ring if the central processing unit is prepared for clocked emission of the data intended for the bus users. In other words, the central processing unit sends the data or data packets intended for the bus users successively connected to the data line offset in time behind one another in accordance with the clocking. Each of these data packets is available at a precisely predetermined and, in particular, predictable time for the connected bus user.

If, furthermore, a monitoring unit which activates a transmit activity of the interface only after receiving a synchronization message and otherwise blocks this activity is allocated to each bus user, the bus users also only send their data into the data line at a predictable time. The data sent into the data line by in each case one bus user are available to the central processing unit at a precisely predetermined time. Since the transmit activity of the interface is only activated after receiving a synchronization message, it is also ensured that a defective bus user does not send meaningless data into the data line as a result of which the entire communication can fail in a conventional bus architecture.

Overall, a determinism is achieved within the bus architecture. The data coming back from the bus users can be in each case allocated to a specific bus user via the time correlation. If no data are available for the central processing unit at a particular period of time, it can be inferred that a specific bus user has failed. If the central processing unit detects unexpected data within a certain time interval, an error of a specific bus user can be inferred and this bus user can be deactivated, for example. In other words, errors within the bus architecture can be located in this manner.

Naturally, using such a bus architecture is not restricted to aviation. It can be used wherever high availability and rapid locating of error sources is of importance.

The bus users advantageously in each case contain their own processor. Such local "intelligence" allows the data line to be relieved since the local processor can handle its own logic tasks such as complex control and/or monitoring functions locally. Via the data line of the bus architecture, control and/or read-out data are also exchanged with the processor of the respective bus user.

It is also advantageous if the bus users in each case has two transceiver units, the first transceiver unit being connected to the processor and the second transceiver unit being embodied as a hardware chip. Such dual construction allows the implementation of a monitoring function where the software section and the hardware section observe each other. In particular, the hardware chip, due to electronic interconnection, can supply the same output data when receiving data as the transceiver unit connected to the processor.

In the case of two transceiver units in the bus user, the first transceiver unit is suitably connected to the second transceiver unit for monitoring output signals and has a signal output for outputting a control signal which is connected to the monitoring unit or the bus interface. If the transceiver unit connected to the processor detects atypical behaviour of the hardware chip, the bus interface is blocked with regard to its transmit activity by the monitoring unit via the signal output or directly.

In a further advantageous embodiment, the bus users contain a memory chip which is prepared for storing the data to be interrogated by the central processing unit during the deactivation of the transmit activity of the associated interface. This relieves any possible processor. There is no preparing of data during the transmit activity via the processor. Instead, the data stored in the memory chip during the deactivation phase are called up and sent into the data line.

If the data line and/or the central processing unit contain an interface to other bus systems, this provides a communication or a data exchange, respectively, between different bus systems. Thus, the information obtained from the bus users of the bus architecture described can be fed, for example, into a higher-level bus system which is used for monitoring and displaying functions of an aircraft.

In a particularly advantageous embodiment of the invention, the bus users are local electronic door controls of an aircraft. In modern aircraft such as, in particular, the airbus A380, passenger doors and freight doors are no longer controlled and monitored mechanically but electronically. In this arrangement, each door contains a local door controller which detects and drives, respectively, any door position via sensors and actuators. In particular, the monitoring of the door closing function is of extraordinary significance for the safety of the aircraft. To drive and interrogate the respective door status, the local door controls are integrated as bus users into the bus architecture described here.

The data line and the bus interfaces are advantageously configured to conform to the CAN (Controller Area Network) bus. The physical configuration of a CAN bus and the coding of the data to be exchanged and the associated protocol are internationally standardized in ISO 11898. Due to such a configuration, proven technology with regard to the bus control units and the bus interfaces can be used.

To increase the fault tolerance, it is also advantageous if the bus architecture is constructed with triple redundancy. In this case, each individual component exists in triplicate. This applies to the data line just as well as the central processing unit and to each bus user. If contradictory information is read out of the three redundant data lines, the decision is made in accordance with the majority principle. A bus architecture of the type described which is configured in this manner has the required characteristics for being used in an aircraft.

The second object mentioned is achieved in accordance with the invention for a method for exchanging data between a central processing unit and a number of bus users in a bus architecture of the type initially mentioned in that one transceiver unit of the central processing unit operates as a transmitter and another transceiver unit is connected as a receiver. The two transceiver units swap their task after a predetermined period of time. The transceiver unit that is presently connected as the transmitter successively sends the data intended for the respective bus users with an information signal into the data line with a predetermined clock time. The transceiver unit presently functioning as the receiver, monitors the data exchange in the data line. Each information signal is provided with a synchronization message and addressing message. The bus users only send for a predetermined period of time after receiving the associated synchronization signal and otherwise only receive while the sending is blocked.

Due to the fact that the two transceiver units of the central processing unit, which are in each case connected to one end of the ring-shaped data line, operate alternately as transmitter and as receiver, the individual data packets circulating in the data line can be observed from two directions and errors can be accurately located correspondingly. While one transceiver unit is sending, the other transceiver unit is observing the circulating data packets. Switch-over occurs after a certain time.

It is of advantage, in particular, if the clock time essentially corresponds to the cycle time of a signal in the data line divided over the number of bus users. In this case, the clock time is used for the data exchange with the respective bus user. After circulating in the ring-shaped data line, data has been exchanged with every bus user.

In this case, it is also appropriate if the transceiver units in the central processing unit swap their task after the cycle time and the bus users send for the duration of the clock time after receiving the synchronization message. In this case, the monitoring direction is reversed with regard to the data line after a complete data exchange with all bus users. This maximizes error locating. For each bus user, the maximum possible time frame is provided for the data exchange.

Other features which are considered as characteristic for the invention are set forth in the appended claims.

Although the invention is illustrated and described herein as embodied in a bus architecture and a method for exchanging data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
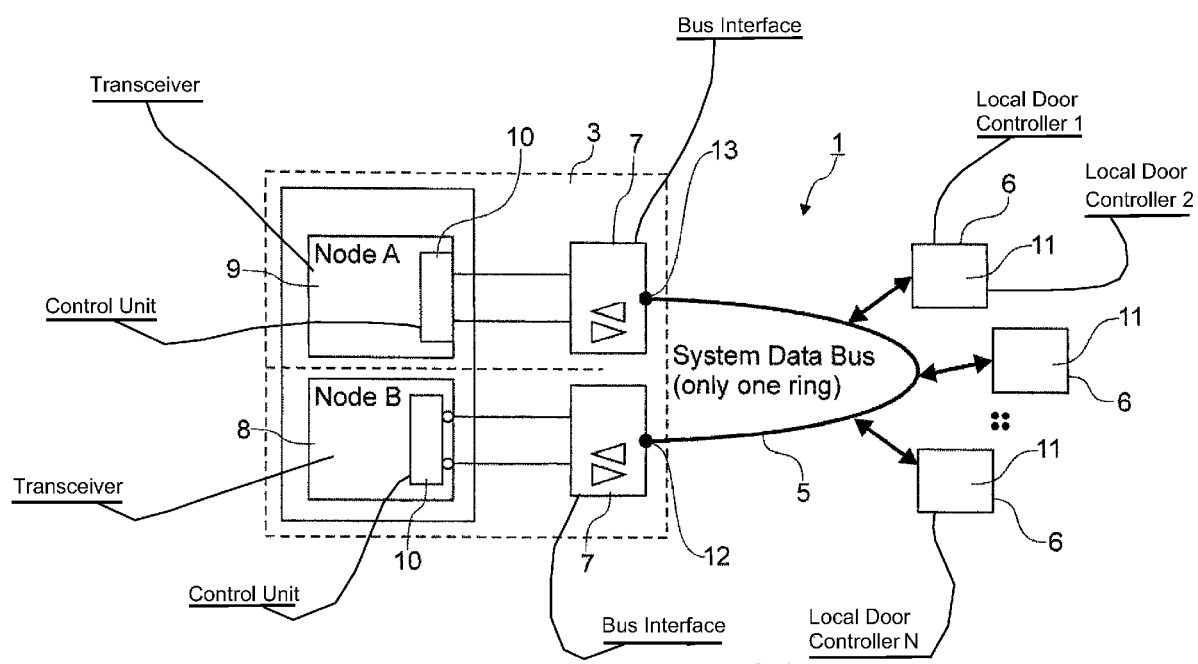
FIG. 1 is a block circuit diagram of a bus architecture according to the invention.

Referring now to the figures of the drawing in detail and first, particularly, to FIG. 1 thereof, there is shown a bus architecture 1 that contains a central processing unit 3, a data line 5 and bus users 6. In the bus architecture 1, the central processing unit 3 operates as a "master" whereas the individual bus users 6 act as "slaves".

The central processing unit 3 has two bus interfaces 7 which are connected to transceiver units 8 and 9 via one bus control unit 10 in each case. The bus users 6 are successively also connected to the data line 5 via non-illustrated bus interfaces. The data line 5 is constructed to be ring-shaped, a first end 12 of the data line 5 being connected to the transceiver unit 8 via the associated bus interface 7 and a second end 13 of the data line 5 being connected to the other transceiver unit 9 via the corresponding bus interface 7. The two transceiver units 8 and 9, respectively, alternately operate as transmitter and as receiver. In this arrangement, the data for the data line 5 are coded for the data line 5 or decoded for the transceiver units 8 and 9, respectively, by the bus control units 10; the bus interfaces 7 are used for level matching of the data to be exchanged. Both the bus control units 10 and the bus interfaces 7 operate in both directions.

Figure 2:
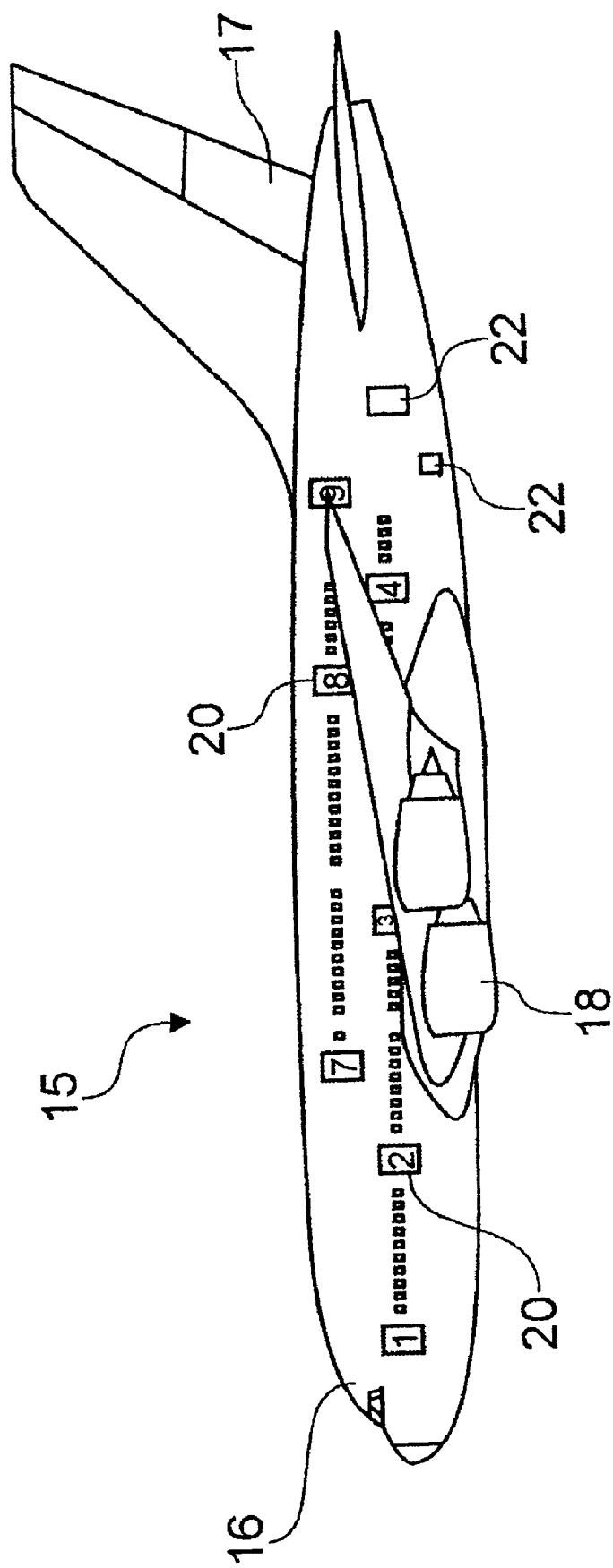
FIG. 2 is a diagrammatic, side view of an aircraft.

FIG. 2 shows a modern passenger plane 15 in a side view, a cockpit 16, a tailfin 17 and engines 18 of which can be clearly seen. Such an aircraft 15 has a row of passenger doors 20 and freight doors 22 on both sides. Both the passenger doors 20 and the freight doors 22 are provided with local door controls which are linked into the bus architecture 1 according to FIG. 1 as the bus users 6.

Figure 3:
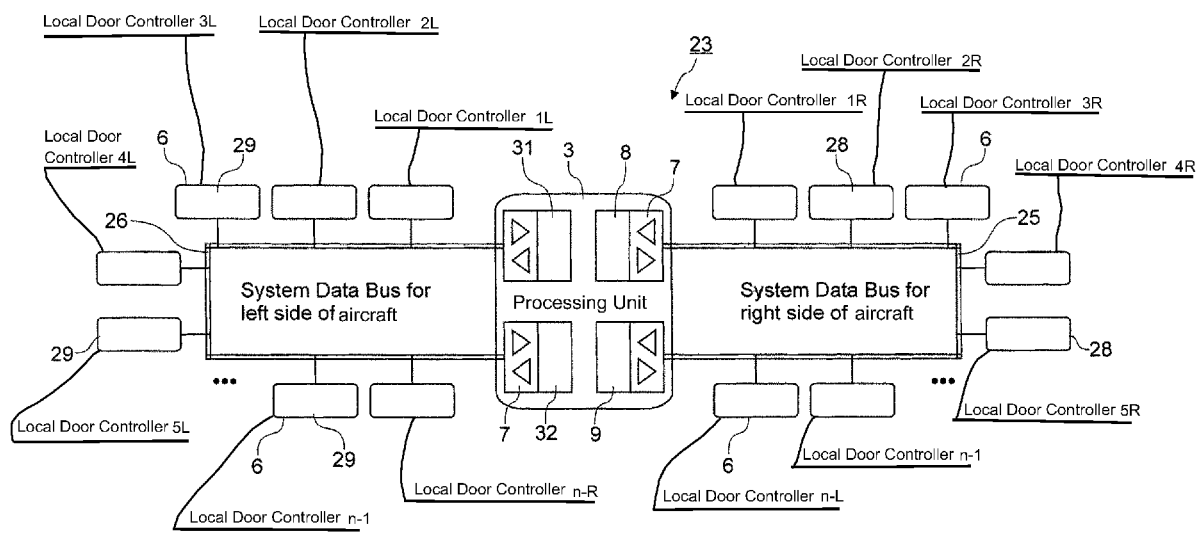
FIG. 3 is a block circuit diagram of the bus architecture for exchanging data with local door controls of an aircraft.

To achieve a sufficiently rapid data exchange between the central processing unit 3 and the local door controls 6, the right-hand door controls 6 disposed on the right-side of the aircraft 15 and the left-hand door controls 6 disposed on the left-hand side of the aircraft 15 are in each case connected to their own data line. This can be seen in FIG. 3 which diagrammatically shows a further bus architecture 23 for separately driving the right-hand and left-hand door controls 6 of the aircraft 15 shown. The central processing unit 3 can be seen which is connected to a right-hand data line 25 and to a left-hand data line 26 via bus interfaces 7. The local door controls 28 disposed on the right-hand side of the aircraft 15 are connected as bus users 6 to the right-hand data line 25. The left-hand door controls 29 disposed on the left-hand side of the aircraft 15 are connected as the bus users 6 to the left-hand data line 26.

The central processing unit 3 correspondingly has a total of four transceiver units 8, 9, 31 and 32, respectively. In this configuration, the transceiver units 8 and 9 are used for sending and for receiving, respectively, data in or from the right-hand data line 25, respectively. The transceiver units 31 and 32, respectively, are correspondingly allocated to the left-hand data line 26.

Figure 4:
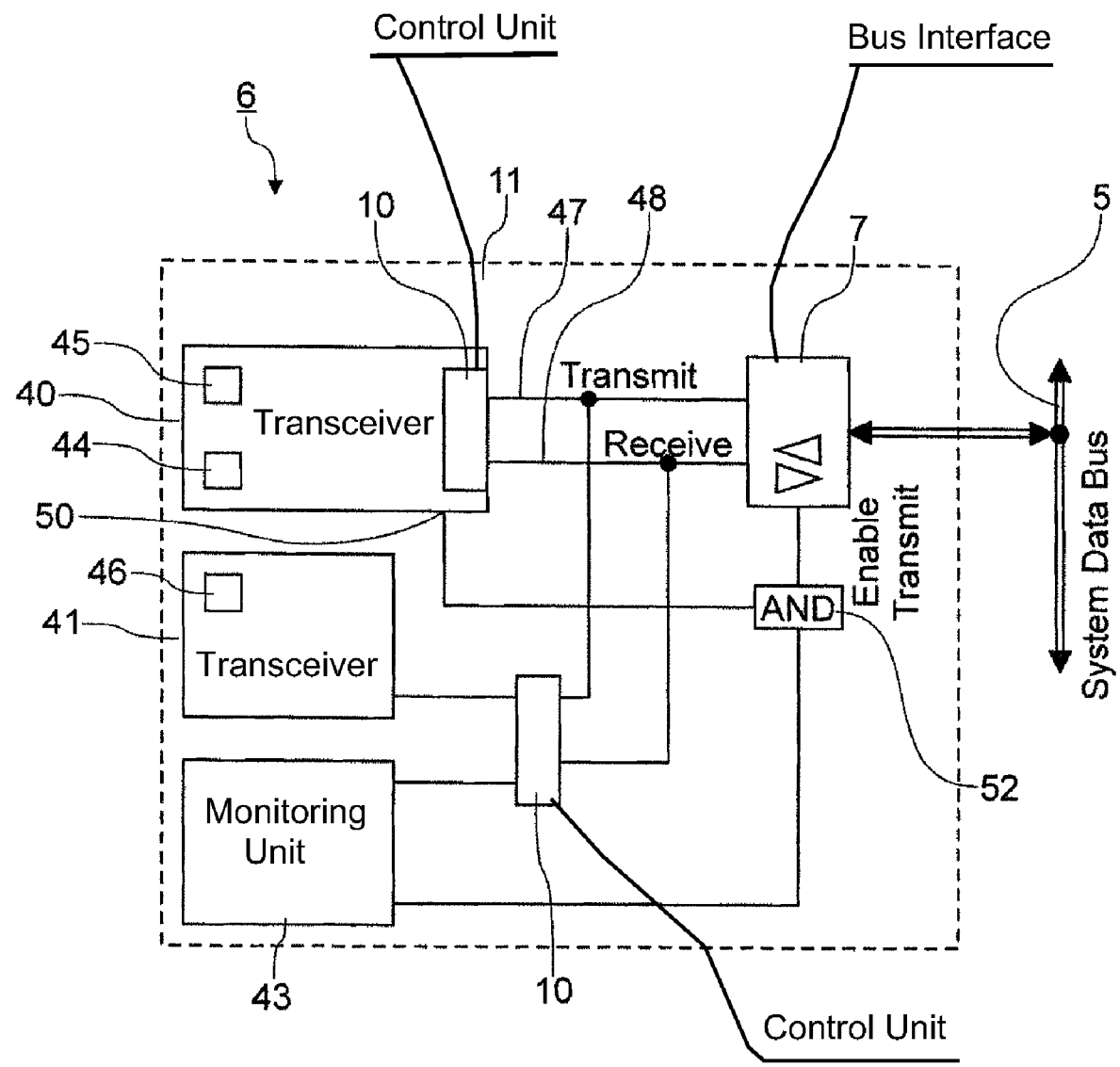
FIG. 4 is a block circuit diagram showing the structure of a bus user.

FIG. 4 diagrammatically shows the structure of the bus user 6. The bus user 6 has a bus interface 7 for connection to the data line 5 for level matching. Two transceiver units 40 and 41 are connected to the bus interface 7. A bus control unit 10 is in each case interposed for coding and decoding, respectively, the data to be exchanged. The transceiver unit 40 has a memory chip 44 and a processor 45. The transceiver device 41 contains a hardware chip 46. The transceiver unit 40 can monitor the transmit data of the transceiver unit 41 via a common transmit line 47.

The transceiver unit 41 shares the associated bus control unit 10 with a monitoring unit 43 which is connected to the bus interface 7. The monitoring unit 43 only activates the transmit activity of the bus interface 7 when a correspondingly allocated synchronization message is received via the data line 5. Otherwise, the bus interface 7 is only activated for reception.

If the software-based transceiver unit 40 detects an error in the output data of the transceiver unit 41, a control signal is generated which is supplied to the connection between the monitoring unit 43 and the bus interface 7 via a signal output 50 and a logic chip 52 in the form of an AND operation. The result is that the bus interface 7 is activated for sending only when the transceiver unit 40 is enabled.

At a predetermined time, a corresponding data packet which contains a synchronization message and an addressing message is available for the bus user 6 shown. The monitoring unit 43 detects the synchronization message and the addressing message and recognizes that the following data packet is addressed to its own bus user 6. The bus interface 7 is thereupon activated to send. The transceiver unit 40 and the transceiver unit 41 respond to the data sent to them and send their output data via the bus interface 7 into the data line 5. In particular, the transceiver unit 40 sends the data written into the memory chip 44 during the passive sending time by the processor 45. The processor 45 is constructed, for example, as a local door control which processes data from numerous actuators and sensors and provides data via the memory chip 44. This makes it possible to interrogate the door status which is of importance to the safety of the aircraft.

The monitoring function of the transceiver unit 40 with regard to the transmit data of the transceiver unit 41 ensures additional safety. Furthermore, the monitoring unit 43 ensures that no unnecessary or even falsely generated data volumes pass into the data line 5 since it activates the bus interface 7 for sending only for a certain time. Whereas a transmit unit which has failed as "babbling idiot" blocks the data line 5 due to the volumes of meaningless data in a usual bus architecture, data are only sent into the data line 5 for the open period of time of the transmit activity of the interface 7 in the present case if the processor operates incorrectly as "babbling idiot". The receiving transceiver unit 8 and 9, respectively, of the associated central processing unit 3 detects these "meaningless" data and can take countermeasures since the faulty bus user can be inferred from the time correlation. The bus architecture as a whole remains operable.

Figure 5:
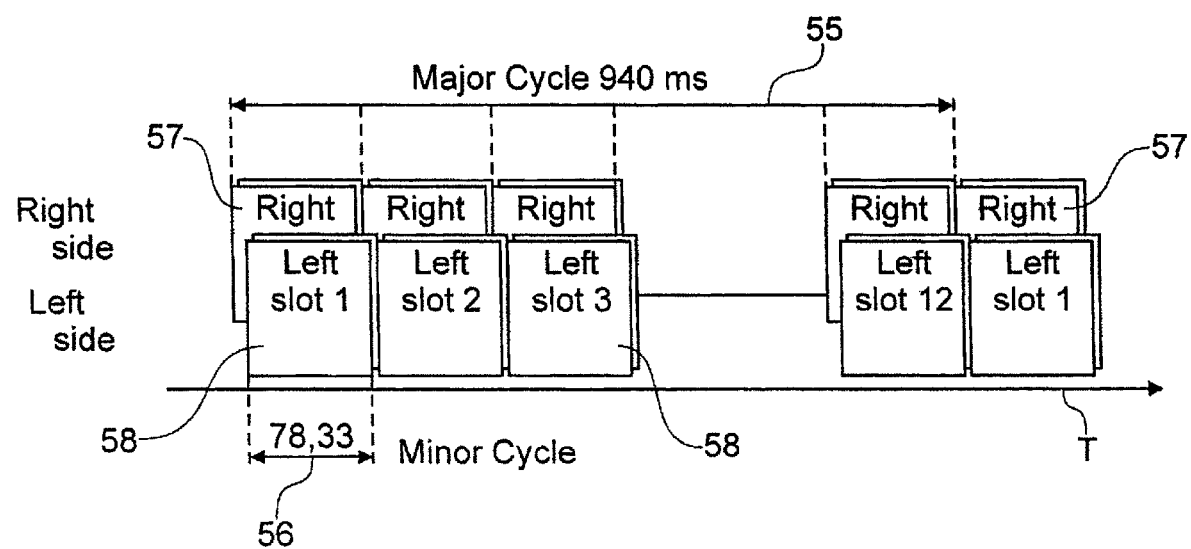
FIG. 5 is a diagram showing the time variation of a data exchange within the data line.

FIG. 5 shows the time variation of the data exchange within the bus architecture described. It shows the data exchange for a cycle time 55 in the ring-shaped data line. Data packets 57 and 58 intended for the respective bus users are sent successively into the ring-shaped data line with a clock time 56. The data packets 57 are intended in this case for local door controls disposed on the right-hand side of the aircraft whereas the data packets 58 are allocated to the left-hand door controls disposed on the left-hand side of the aircraft.

All the data packets 57 and 58 are successively sent once within the cycle time 55. This determinism makes it possible to correlate errors occurring within the data packets 57 and 58 with a respective local door control.

Figure 6:
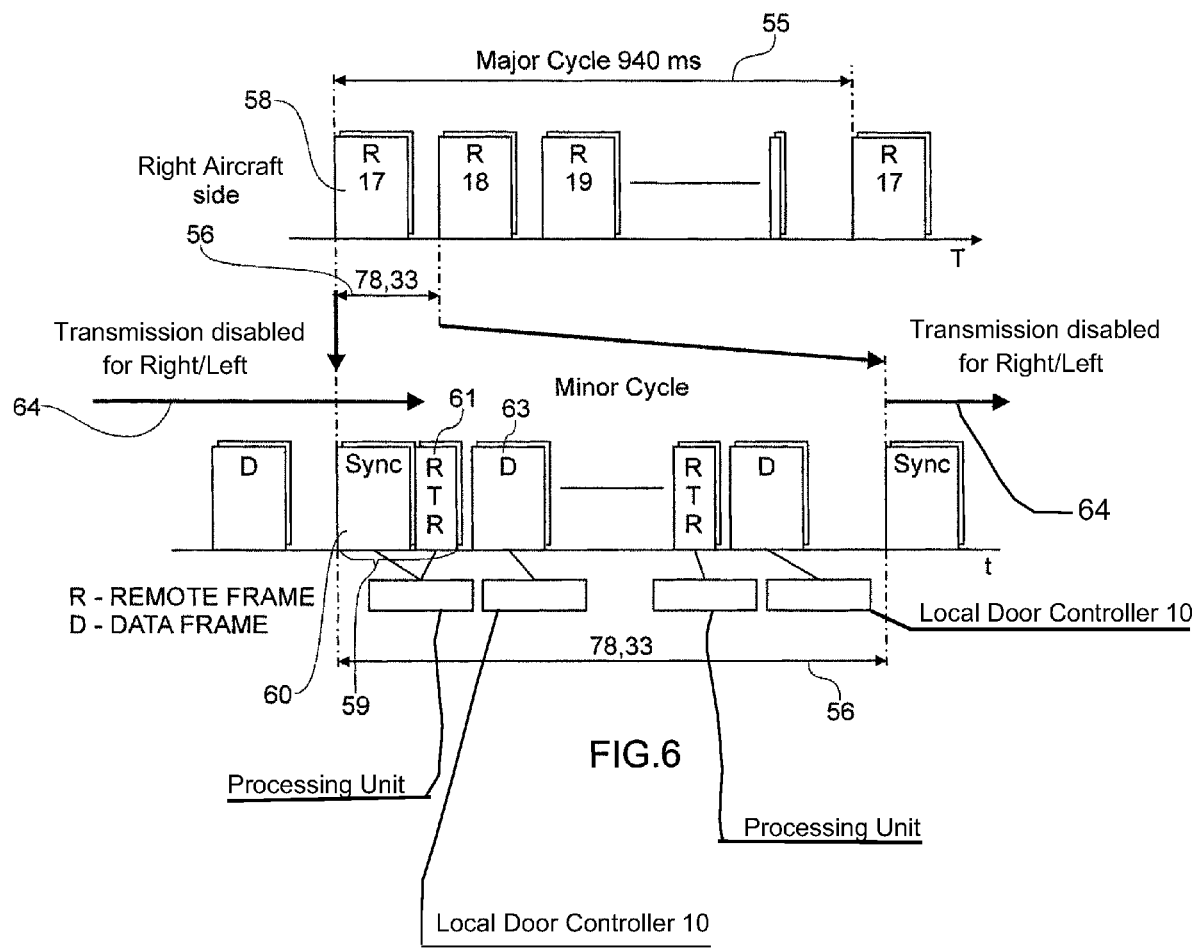
FIG. 6 is a diagram showing the time variation of the data exchange with one bus user.

The structure of one of the data packets 57 or 58, respectively, shown within the clock time 56 can be found in FIG. 6 in detail. To clarify, the cycle time 55 and the individual data packets 58 are again shown as section from FIG. 5. The clock time 56 is shown additionally spread out. Within the clock time 56, the data packet 58 located in the data line contains a preceding information signal 59 generated by the central processing unit which contains a synchronization message 60 and an addressing message 61. After receiving the synchronization message 60 and the addressing message 61, the monitoring unit 43 shown in FIG. 4 switches the bus interface allocated to the bus user to be active for sending so that the corresponding local door control sends its transmit data 63 into the data line. After a predetermined time which corresponds to the clock time 56, the transmit function of the corresponding interface is deactivated. In the period of time shown by the arrows 64, the specific local door control or the specific bus user, respectively, does not send any data into the data line. These periods of time are available to the other bus users.

This application claims the priority, under 35 U.S.C. §119, of German application DE 10 2005 035 611.7, filed Jul. 29, 2005; the prior application is herewith incorporated by reference in its entirety.

We claim:

1. A bus architecture, comprising:
a central processing unit having a bus interface;
a data line being a loop having two ends each connected to said central processing unit;
a number of bus users each having a bus interface, said central processing unit and said bus users in each case being connected to said data line through said bus interface, said bus users being successively connected to said data line;
said central processing unit having two transceiver units, wherein a first one of said transceiver units operates as a transmitter while a second one of said transceiver units operates as a receiver, and after a predetermined period of time, said first one of said transceiver units operates as a receiver while said second one of said transceiver units operates as a transmitter, one of said transceiver units in each case is connected to one of said two ends of said data line via said bus interface, said central processing unit is prepared for a clocked emission of data intended for said bus users; and
said bus users each having a monitoring unit connected to an associated said bus interface, said monitoring unit configured for activating a transmit activity of said bus interface only after receiving a synchronization message, otherwise said monitoring unit blocking the transmit activity.

2. The bus architecture according to claim 1, wherein said bus users each having a processor.

3. The bus architecture according to claim 2, wherein said bus users each having two bus transceiver units, including a first bus transceiver unit connected to said processor and a second bus transceiver unit being embodied as a hardware chip.

4. The bus architecture according to claim 3, wherein in each of said bus users, said first bus transceiver unit is connected to said second bus transceiver unit for monitoring output signals and has a signal output for outputting a control signal and is connected to said monitoring unit or said bus interface.

5. The bus architecture according to claim 1, wherein said bus users have a memory chip for storing data to be interrogated by said central processing unit during a deactivation of transmit activity of said bus interface.

6. The bus architecture according to claim 1, wherein said data line and/or said central processing unit has an interface to other bus systems.

7. The bus architecture according to claim 1, wherein said bus users are local electronic door controls of an aircraft and the bus architecture being configured for aircraft use.

8. The bus architecture according to claim 1, wherein said data line and each of said bus interface are constructed to conform to a controller area network bus.

9. The bus architecture according to claim 1, wherein the bus architecture is constructed with triple redundancy.

10. A method for exchanging data between a central processing unit and a number of bus users in a bus architecture having a data line, which comprises the steps of:
operating a first transceiver unit of the central processing unit as a transmitter while a second transceiver unit of the central processing unit operates as a receiver, and after a predetermined period of time, operating the second transceiver unit of the central processing unit as a transmitter while the first transceiver unit of the central processing unit operates as a receiver;
successively sending, via the transceiver unit presently operating as the transmitter, data intended for the bus users with an information signal into the data line with a predetermined clock time, the information signal having a synchronization message and addressing message;
monitoring, via the transceiver unit presently functioning as the receiver, a data exchange in the data line; and
the bus users sending the data during the predetermined period of time only after receiving the synchronization message and otherwise the bus users only receiving and being blocked from sending.

11. The method according to claim 10, wherein the bus users monitor their own operability with first and second bus transceiver units and sending is allowed or blocked in dependence on monitoring results.

12. The method according to claim 11, which further comprises storing data, via the bus users, when sending is blocked and that stored data are sent into the data line during sending.

13. The method according to claim 10, which further comprises setting the predetermined clock time to correspond to a cycle time of a signal in the data line divided over the number of bus users.

14. The method according to claim 13, wherein the first and second transceiver units of the central processing unit swap their tasks after the cycle time and that the bus users send for a duration of the predetermined clock time after receiving the synchronization message.

15. The method according to claim 10, which further comprises exchanging the data in accordance with a controller area network bus protocol.

* * * * *